United States Patent
Sawyer et al.

(10) Patent No.: US 6,324,271 B1
(45) Date of Patent: Nov. 27, 2001

(54) SYSTEM AND METHOD FOR AUTHENTICATION OF CALLER IDENTIFICATION

(75) Inventors: W. Donald Sawyer, Kanata (CA); Patrick Michael O'Shaughnessey, New York, NY (US); Christian P. Gilby, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/375,396

(22) Filed: Aug. 17, 1999

(51) Int. Cl.$^7$ ...................................................... H04M 1/56
(52) U.S. Cl. ................................ 379/142.05; 379/142.06; 379/142.04
(58) Field of Search .................................... 379/142, 144, 379/67.1, 354, 355, 356, 357, 91.01, 112, 220, 221, 201, 142.01, 142.05, 142.09, 142.1

(56) References Cited

U.S. PATENT DOCUMENTS

| | | | |
|---|---|---|---|
| 3,787,626 | 1/1974 | Subieta | 179/5.5 |
| 5,263,084 | 11/1993 | Chaput et al. | 379/215 |
| 5,274,695 | 12/1993 | Green | 379/88.02 |
| 5,289,542 | * 2/1994 | Kessler | 379/142 |
| 5,521,966 | * 5/1996 | Friedes et al. | 379/91 |
| 5,608,784 | 3/1997 | Miller | 379/88.02 |
| 5,832,072 | * 11/1998 | Rozenblit | 379/142 |
| 5,903,636 | * 5/1999 | Malik | 379/142 |
| 5,982,866 | * 11/1999 | Kowalski | 379/142 |
| 6,012,049 | * 1/2000 | Kawan | 379/90.01 |

OTHER PUBLICATIONS

Book Title: Telecommunications Primer: Signals, Building Blocks and Networks by E. Bryan Carne. Publisher: Prentice Hall PTR, New Jersey, USA. Copyright 1995. Chapter 9, p. 275.

* cited by examiner

*Primary Examiner*—Curtis Kuntz
*Assistant Examiner*—Rexford Barnie
(74) *Attorney, Agent, or Firm*—Angela C. de Wilton

(57) ABSTRACT

A system and method for caller identification, named certified caller ID (CCID) provides an enhancement to existing calling line identification services by providing the terminating end of a telephone call with a cryptographically-certified identity of the caller, rather than the identity associated with the calling telephone line. Advantageously, in the operation of CCID, the caller's identity is authenticated by a token, such as a smart card or other integrated circuit device which is capable of executing a cryptographic authentication protocol, optionally in conjunction with a Personal Identification Number (PIN) or biometric confirmation. Beneficially, CCID works in conjunction with several associated Customer Local Area Signalling Services (CLASS), e.g. Selective Call Acceptance, Selective Call Forwarding and Distinctive Ring to provide special call treatment based on the identity of the caller.

44 Claims, 2 Drawing Sheets

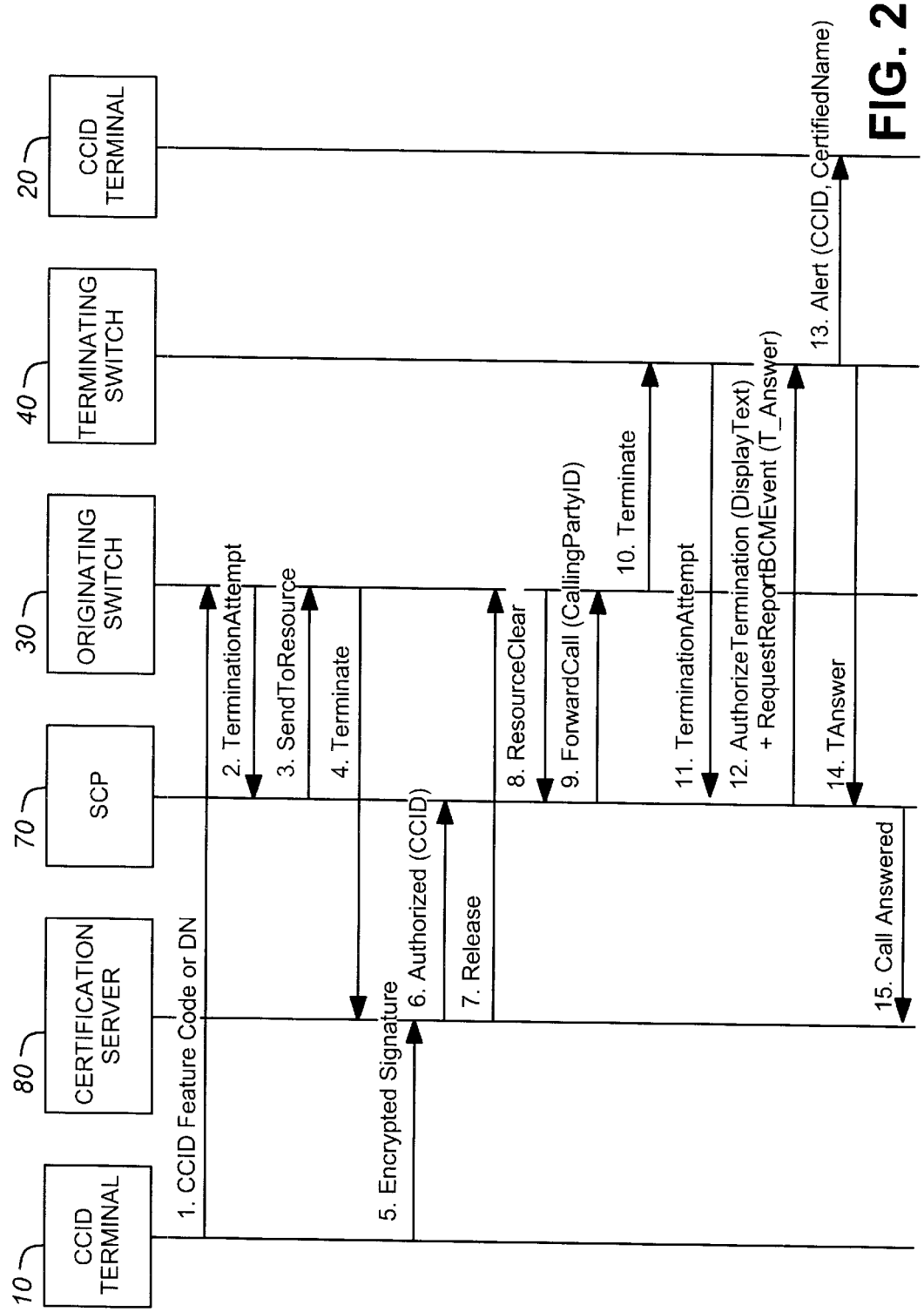

SYSTEM AND METHOD FOR AUTHENTICATION OF CALLER IDENTIFICATION

FIELD OF THE INVENTION

This invention relates to a system and method for caller identification, and more particularly to a system, method, and computer readable medium for implementing a method for authentication of caller identification for telephone calls.

BACKGROUND OF THE INVENTION

Conventional calling line identification (CLID) and the associated display terminals are now known in the market. Known CLID services deliver the directory number, subscriber name or business name associated with the calling telephone line rather than the callers true identity. Human recognition of the caller, if known to the called party, must be relied on for verifying a caller's identity. However the value of human recognition is limited by the fact that the caller may not be known to the called party, or the called party may be a machine rather than a person. Thus known CLID services fail to provide an assured identity of the caller that can be acted on reliably.

Consequently the CLID cannot be acted on with certainty since the same CLID is delivered regardless of who actually places the call. For example, when all members of a household share the same CLID associated with a subscriber number, the displayed name and number does not identify which of several family members is making the call. If a call is placed by an individual away from their customary phone as would occur for a business traveller at a payphone, hotel room, or colleague's desk, the caller's personal identity is not delivered. In some situations the privacy of the caller may be violated since the caller's physical location may unwittingly be disclosed by CLID. These limitations of CLID inhibit its use in providing preferential or customized treatment for the caller regardless of location, and in automatic processing of the call in a call handling telephone switching or computer processing systems. In addition, the unreliability of CLID in providing actual caller identity precludes its use as a non-repudiation mechanism in situations, such as a phone order to a stock broker, where caller identification is critical.

A known approach to addressing the limitation of CLID is to have a computer telephony system answer the call and prompt the caller for an identifier which is then used to route the call or perform a database lookup. This however precludes the use of the caller's identity to provide selective treatment (e.g. forwarding) of the call prior to ringing the terminating device. This approach is also vulnerable to fraud since an identifier can easily be intercepted by a passive wiretap or, for example, guessed from the caller's name. For example, a known system now on the market uses the first three letters of the caller's name as the identifier.

U.S. patent application Ser. No. 09/20681 filed Dec. 11, 1998, to D. B. Gutzmann, entitled "Network calling party identification, authentication and routing in response thereto. This application provides an approach based on using an intrinsic property of the calling party, such as an audible utterance, which is compared with stored representations of a voice profile, using voice recognition technology. Alternatively, other biometric information such as a fingerprint or facial image may be used. Nevertheless such an approach requires an appropriate system and terminal equipment for collection of intrinsic information, storage of representations and processing of such information for authentication, which may not be possible with existing Calling Line ID base computer telephony systems.

SUMMARY OF THE INVENTION

Thus, the present invention seeks to provide a system and method for caller identification which avoids or circumvents the above mentioned problems.

Thus according to one aspect of the present invention there is provided a process for caller identification comprising: certification of caller identification (CCID), wherein certification comprises: receiving from a caller called party information and a token associated with caller identification, performing authentication of caller identification using the token, and during alerting of a called party line, sending to the terminating set authentication information and caller information including certified caller identification.

Preferably, the step of performing authentication comprises authentication with a time varying cryptographic token.

This enhancement of CLID is called Certified Caller ID (CCID). CCID overcomes the above mentioned problems of identification of a caller, rather than a calling telephone line, since the identity of the caller is linked to the use of a token by the caller.

According to another aspect of the invention there is provided a system for caller identification comprising certification of caller identification (CCID) comprising: means for receiving from a caller called party information and a token associated with caller identification, means for performing authentication of caller identification using the token, and means sending to the terminating set authentication information and caller information including certified caller identification, during alerting of a called party line.

Advantageously, the means for performing authentication comprises means for authentication with a time varying cryptographic token and provides certified caller ID which is a significant enhancement to existing calling line identification services, e.g. calling number display and calling name display, to provide the terminating end of a telephone call with a cryptographically-certified identity of the caller rather than the identity associated with the calling telephone line.

Another aspect of the invention provides a computer readable medium for implementing a method for caller identification with certification of caller identification (CCID), wherein certification comprises: receiving from a caller called party information and a token associated with caller identification, performing authentication of caller identification using the token, and during alerting of a called party line, sending to the terminating set authentication information and caller information including certified caller identification.

In the operation of CCID, the caller's identity is typically authenticated by a token, such as a smart card or other integrated circuit device which is capable of executing a cryptographic authentication protocol. One such integrated circuit device comprises a tamper-proof time-keeping and encryption mechanism that would generate a time-varying Personal Identification Number (PIN). A less secure variation of CCID could, at the option of the service provider, indicate that the call has been certified if the call were placed using a telephone calling card with a standard PIN. Alternatively, a more secure variation could be implemented in which the authentication took place in conjunction with a known biometric confirmation mechanism such as a fingerprint scanning, voice recognition, iris scanning of the eye, or hand characterization. Since different authentication mechanisms may be used for CCID, it is envisaged that a certification level would be associated with each call and delivered to the terminating end together with the reserved symbol that denotes that the identity of the caller has been certified. The individual or equipment accepting the call could then act on the certification level as appropriate.

Beneficially, CCID works in conjunction with several associated Customer Local Area Signalling Services (CLASS) such as Selective Call Acceptance, Selective Call Forwarding and Distinctive Ring to provide special call treatment based on the identity of the caller.

CCID would also provide certified caller identity to computer systems across a standard Computer Telephony Interface (CTI) so that a database lookup could be performed prior to accepting the call, and/or the call could be given preferential treatment in a call centre using an Automatic Call Distribution (ACD) system. Advantageously, CCID uses the existing MDMF protocol for calling number and calling name delivery which are sent to the terminating device in the quiet interval following the first ring.

When the caller's name and number appear on the display for a CCID call, the information displayed is distinguished from a CLID call by the use of a reserved symbol (i.e. a particular character not permitted as the first character of a name) preceding the name , which would indicate to the terminating equipment that the name and number were certified, followed by a number indicating the certification level of the call (e.g. !3 appearing in the first two positions of the name could indicate a certified call with certification level 3). The caller's name and number, together with the date and time would be delivered in the interval between rings using the existing Multiple Data Message Format (MDMF) protocol. The date and time parameters are already provided with current CND/CNAM delivery implementations. Two additional parameters would be added to the MDMF transmission: the called-line directory number and a digital signature R. The digital signature would be computed across the information in the MDMF record using a secret key (known only to the service provider) thereby certifying the contents of the record and preventing any modification without detection. Verification of the CCID signature would be done by the terminating computing equipment using the public signature-key established by the service provider in accordance with accepted public-key cryptographic signature techniques. The called-line directory number is included to thwart a possible attack in which a CCID MDMF message intended to terminate on line. A was electronically captured and use to provide fraudulent CCID on line B.

When the terminating equipment is a telephone or adjunct device equipped to display calling number and name, the presence of the reserved character before the name would signify to the person receiving the call that the call was certified.

When the terminating device is a computer, it could either act directly on the identity appearing in the MDMF sequence after verifying the signature, or it could retrieve a full digital certificate from a network server using the signature R as the reference. This certificate would encompass the information delivered in the MDMF record plus the time when the call was answered, and additional information, such as address and/or company name, to further identify the caller. An unanswered call would have a null answer time to indicate that the call had not be answered. An alternative implementation of CCID in an Internet Protocol Telephony situation would deliver the same information as provided with the MDMF protocol the TCP/IP protocol suite.

Thus, the provision of certification for caller identification opens up a range of services which would not otherwise be feasible without assured identification of the caller.

BRIEF DESCRIPTION OF THE DRAWINGS

The invention will now be described in greater detail with reference to the attached drawings wherein:

FIG. 2 shows a chart representing a certified caller ID message sequence according to the first embodiment.

DETAILED DESCRIPTION OF THE INVENTION

Figure 1:
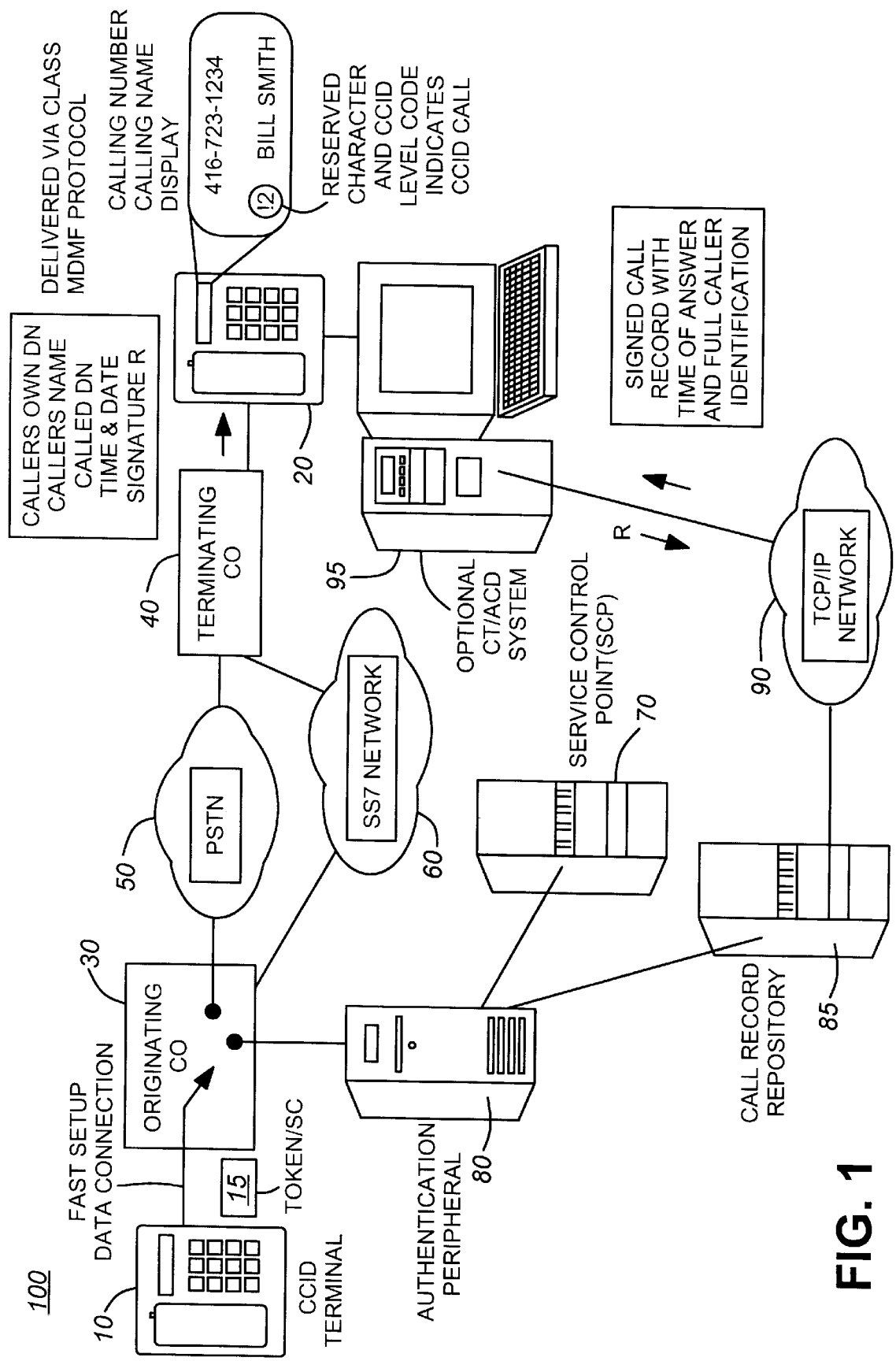
FIG. 1 shows a schematic representation of telecommunications network comprising for implementing certified caller ID according to a first embodiment of the present invention.

A system and method for providing caller identification with certification according to a first embodiment of the present invention is described with reference to a system for providing CCID based on a display phone 10 equipped with a Smart card reader, e.g. a Nortel Vista 364 Smart card enabled phone, for reading a smart card or other token 15 connected to a telephone network 100 represented schematically in FIG. 1 for connection to a called terminal 20.

The network 100 comprises an originating switch or originating central office (CO) 30 and terminating switch or terminating CO 40 linked by a conventional PSTN network 50, and SS7 Network 60 connected to service control point (SCP) 70. The network also comprises an authentication peripheral 80 i.e. a server, for implementation of an authentication step to be described below. Also shown in FIG. 1 is a link from the originating CO 30 to the called terminal 20 via the authentication peripheral 80, a call record repository 85, through an TCP/IP network 90 to an optional CT/ACD system 95 for providing a signed call record with time of answer and full caller identification.

A message sequence for providing certified caller ID using a network 100 as shown in FIG. 1, is represented schematically in FIG. 2 which is described in more detail below.

The supported CLASS standards for CLID include fields for name (CNAM), calling number(CND), date and time. If either CND or CNAM is not available, it is replaced by a parameter giving the reason (private or out-of-area) for the absence of the CND or CNAM parameter. If CNAM is to be delivered, the MDMF protocol must be used. MDMF is an open-ended protocol which can technically be extended with more parameters in the future. In Bellcore document TR-NWT-000031 (issue Dec. 4, 1992) it is stated that a future objective is to use the MDMF protocol both for CND only delivery and for CND/CNAM delivery in which case the existing Single Data Message Format (SDMF) protocol, now used only for CND delivery, would no longer be supported.

The above mentioned CLID problem is solved by having the caller's identity securely tied to an electronic token, e.g a Smart card possessed by the caller. The use of this token may optionally be augmented by a PIN number or biometric verification step to protect against loss of the card and its subsequent fraudulent use by the finder.

The process for caller identification comprises certification of caller identification, wherein certification comprises: receiving from a caller, called party information, and a token associated with caller identification, performing authentication of caller identification using the token, creating and delivering to the terminating telephone switch a digitally signed record comprising the telephone number, or other numeric identifier, of the caller, the caller's name preceded by a reserved character indicating that the call is certified, the current date and time, the called telephone number and a digital signature, sending authentication information and called party information with the alerting of the called party line and sending to the terminating set, caller information, including certified caller identification, using standard calling information delivery.

Typically the caller information comprises a telephone number DN. Alternatively caller information may be an associated identification, e.g. a CCID feature code, name or userid associated with the telephone number of the called party.

Advantageously, authentication of the token holder is based on a challenge/response protocol using a secret key contained within the token that is used to uniquely encrypt a random challenge (number) issued by an authentication server temporarily linked to the originating caller's terminal, telephone or computing device. This challenge/response mechanism defends against an attempt to record and replay the identification by an interloper using a passive wiretap order to mimic a legitimate user.

The authentication protocol may be a known suitable protocol or a protocol adopted specifically for CCID.

Known authentication protocols include the X.509 authentication protocol. Known CLID delivery protocols include the Single Data Message Format (SDMF) and Multiple Data Message Format (MDMF) as specified in Bellcore Document TR-NWT-000031, a component of LSSGR, FR-NWT-000064.

In addition to delivering caller's name, N, and number, D, the CCID service delivers a reference, R, to a digitally signed record asserting that a specific token linked to a uniquely identified person had been used at a specific time and date, T, to place a call to a line with terminating directory number DT. The terminating directory number DT and the reference, R, to the digital certificate would appear as a new parameter in the MDMF format and R itself would be a digital signature on D, N, T, and DT. A reserved symbol, at the beginning of the caller's name field would be used to flag the name as certified. This authentication protocol is an instance of the X.509 one-way authentication protocol in which a digitally signed time-stamp is used to thwart a replay of the certificate.

The communication link used to perform the authentication at the originating end depends on the device used.

In the case of CCID analog telephones, a fast-setup in-band modem technology would be used. In the case of business telephones, such as Nortel's Meridian sets mentioned above, which have a concurrent signalling channel, that channel or an in-band channel could be used. In the case of wireless phones, the existing signalling channel would be used. In the case of phones or personal computers using Internet Protocol (IP) telephony, the existing TCP/IP protocols or in-band modem technology could be used.

In summary, elements involved implementing CCCID include:

an electronic token
  e.g. a smart card, wireless telephone Personal Identification Module (PIM) or a other device capable of securely creating a time-varying personal identification number
telephones equipped for standard Dual Tone Multi Frequency (DTMF) dialling or telephones or adjuncts or other voice communications terminals or personal computers capable of accepting and communicating with the token
  e.g. DTMF telephones, Smart card enabled phones, or personal computers for voice on IP;
a communications network for providing authentication service
  e.g. PSTN network, SS7 network, Advanced Intelligent Network Service Control Point (AIN SCP), AIN Intelligent Peripheral, authentication server, personal computers or computer telephony systems equipped to receive caller identity, Automatic Call Distributors (ACD), and conferencing systems.

Advantageously, the terminating network or terminal of the called party provides customised service or routes call according to the caller identity provided with incoming CCID.

Specific steps involved in implementing certified caller ID according to a first embodiment represented schematically by the flow chart in FIG. 2, with reference to the network elements shown in FIG. 1, setting out steps of a process using a smart card enabled phone connected to a network comprising an authentication server, are as follows:

On the originating switch

A user inserts a smart card or token 15 into suitably equipped phone 10, lifts handset to initiate a call and dials digits for the called party number DN (step 1)

The user may optionally be prompted to enter a personal identification number.

Terminal stores digits for later recall and dials a special feature activation code, optionally notifying the user that the authentication is proceeding by a visual or auditory indication The local switch 30 sends a Termination Attempt message to the SCP 70 serving the local switch (step 2)

The SCP 70 sends Send to Resource message to the local Switch 30 containing a new destination address of an Intelligent Peripheral (IP), i.e. an authentication or certification server 80 (step 3)

The call is terminated to the IP 80 (step 4)

The Terminal 10 and IP 80 perform an authentication handshake, advantageously using challenge/response authentication profile of the type mentioned above (step 5).

The Terminal subsequently sends called party digits, and optionally notifies the user that the call is being attempted The IP sends authentication information and called party information to the SCP directly (step 6) or alternatively sends in information field of a Release message The IP sends the Release message to the local switch, the message comprising calling id info (step 7)

The local Switch sends Resource Clear message to the SCP (forwarding Release info) (step 8)

The SCP sends Forward Call message to the local switch with the authenticated CallingPartyID information and CCID identifier in Presentation Status field (step 9)

The local Switch forwards call to destination (step 10)

On Terminating switch p1 the Switch sends a Termination Attempt message to the SCP (step 11)

the SCP looks at the authenticated CallingPartyID and modified Presentation Status and performs a database lookup the SCP sends back Authorize Termination message with DisplayText parameter set to calling party's CCID name, timestamp, CallingPartyID and digital signature. A reserved character preceding the first character of the name indicates that this is a certified call identification (CCID) In addition, the RequestReportBCMEvent component is appended in the AuthorizeTermination message to request arming of the T_Answer message so that the SCP is informed when the call is answered or incomplete (step 12)

the terminating Switch alerts called party's line, sending SDMF or MDMF information to the terminating set (step 13)

The terminating telephone displays the CCID number and name information.

Optionally, the terminating computer system or suitably equipped intelligent telephone could verify the identity locally or retrieve the full certificate from a server.

The terminating telephone answers the call and the terminating Switch sends a T_Answer message to the SCP which can then inform the IP of the call outcome (step 14)

Thus, certified caller id (CCID) overcomes the above mentioned problems of identification of a caller, rather than a telephone line, since the identity of the caller is linked to the use of a token by the caller.

Advantageously, certified caller ID is a major enhancement to the existing calling line identification services, e.g. calling number display and calling name display, to provide the terminating end of a telephone call with a cryptographically-certified identity of the caller rather than the identity associated with the calling telephone line.

Depending on the application, CCID may be used by an Automatic Call Director system to provide selective or preferential handling of a caller, or with a voice messaging system to provide specific greeting messages for specific callers, or with a voice conferencing system to authenticate new participants as they access the conference, and to announce the names of participants as then join and leave the conference.

Beneficially, CCID works in conjunction with several associated Customer Local Area Signalling Services (CLASS) such as Selective Call Acceptance, Selective Call Forwarding and Distinctive Ring to provide customized terminating call treatment based on the true identity of the caller.

In the operation of CCID, the caller's identity is authenticated by an token such as a smart card or other integrated circuit device which is capable of executing a cryptographic authentication protocol, optionally in conjunction with a Personal Identification Number (PIN) or biometric confirmation mechanism, e.g. a fingerprint, voice characteristics, iris scan of the eye or hand characteristics.

To accommodate existing DTMF telephones, an alternative embodiment of CCID is described in which the dialling of a conventional telephone calling card number and PIN, or the dialling of a calling card number followed by the dialling of a time varying PIN displayed on a suitable cryptographic token, would result in a CCID call. The certification method used for the call would be communicated to the terminating end as a certification level number following the reserved CCID indicator that precedes the caller's name in a CCID call.

CCID would also provide certified caller identity to computer systems across a standard Computer Telephony Interface (CTI) so that a database lookup could be performed prior to accepting the call, and/or the call could be given preferential treatment in a call centre using an Automatic Call Distribution (ACD) system.

For calls terminated on display equipped CLASS telephones, CCID would use the existing protocol for calling number and calling name delivery to the terminating device during the ringing phase of the call.

When the terminating device is an existing CLASS display telephone, the caller's name and number would appear on the display and the reserved symbol in front of the name would indicate to the user that the name and number were certified.

When the terminating device is a computer, it could either act directly on the identity appearing in the MDMF sequence after verifying the signature, or it could retrieve a digitally signed record of the call from a network server using the signature as the reference.

An alternative implementation of CCID in an Internet Protocol Telephony situation would deliver the same information using the TCP/IP protocol suite.

While the particular embodiment described above relates to implementation using a smart card, and a smart card reader equipped phone at the originating terminal, alternatively a smart card reader adjunct could be used in conjunction with existing phones to provide CCID. Smart cards used for CCID could be either dedicated to the CCID application or combined with other functions such as electronic cash or loyalty.

Alternative tokens would include e.g. a wireless telephone Personal Identification Module (PIM) or Java Ring (worn on the finger) for use with other suitably equipped terminals capable of reading the token and interacting with the network to provide authentication services, or a cryptographic token capable of computing a time varying Personal Identification Number which could be entered on the dialpad of a conventional DTMF telephone in conjunction with a telephone calling card number.

Beneficially, the method may be implemented with existing Calling Line ID based Computer Telephony systems.

The terminating switch can act on CCID before ringing, to allow for selective treatment of identified callers.

Potential services based on CCID include:

Selective acceptance of calls from family, friends, colleagues, police, hospital Creation of private virtual group that can intercommunicate (executives, celebrities)

Retrieval of database record of caller based on CCID

Preferential promotion of high-value customers in call centre queue

Non-repudiation of calls: e.g. orders to stock broker, pizza shop, mail-order

Fast completion of agent transactions (travel, shopping) since identity is known Automatic acceptance of collect calls terminating on voice mail Participant identification and Secure access for conferencing Flat-rate, ANI based long distance access from any phone Selective voice mail greetings based on caller's identity Call forwarding and distinctive ring based in caller's identity Lockout protection for feature activation (e.g. call forwarding to Long Distance)

Fast access to voice mail, phone banking etc.

Subscription based audiotex services billed to caller

Identification of caller for long distance (LD) calls originating on shared phone (e.g. dorms)

Protection of DISA and calling card numbers against eavesdropping

Authentication of modem calls

Authentication of pay-per-view TV requests

Thus the provision of CCID to provide assured caller identification opens up market opportunities for many enhanced user services, including commercial services for electronic commerce, with improved security and convenience to the user and called party.

Although specific embodiments of the invention have been described in detail, it will be apparent to one skilled in the art that variations and modifications to the embodiments may be made within the scope of the following claims.

What is claimed is:

1. A process for caller identification comprising:
   providing certification of caller identification (CCID) to a called party by:
   receiving from an individual caller, called party information and a token associated uniquely with caller identification of the individual caller,
   performing authentication of caller identification using the token,
   and,
   during alerting of a called party line, sending to a terminating set certified caller identification comprising the authenticated caller identification and an indication to the called party that the callers identification has been uniquely authenticated by the individual caller.

2. A process for caller identification according to claim 1 wherein the caller identification comprises a name of the individual caller, and the indication that the callers identification has been uniquely authenticated by the individual caller is a reserved symbol.

3. A process according to claim 2 wherein caller identification is provided using multiple data message format MDMF delivery protocol comprising user name N associated with the individual caller, user number D and reference R to a standard X.509 digital certificate, wherein the indication that the callers identification has been uniquely authenticated by the individual caller comprises a character of the name field in the form of a reserved symbol flagging the name as being certified.

4. A process according to claim 3 wherein the reserved symbol is the first character of the name field.

5. A process according to claim 1 wherein calling information delivery protocol comprises multiple data message format MDMF.

6. A process according to claim 5 wherein SDMF/MDMF information comprises user name N, user number D and reference R to a standard X.509 digital certificate.

7. A process according to claim 6 comprising asserting that a specific token linked to a uniquely defined person has been used at a specific time and date T, to place a call to a line with a terminating directory number DT.

8. A process according to claim 7 wherein the reference R comprises a parameter in the MDMF format.

9. A process according to claim 8 wherein R comprises a digital signal on the D, N, T, and DT.

10. A process according to claim 6 wherein a character of the callers name field comprises a reserved symbol flagging the name as being certified.

11. A process according to claim 10 wherein the reserved character is the first character of the callers name field.

12. A process according to claim 5 comprising a one way authentication protocol which is digitally time stamped.

13. A process according to claim 10 comprising displaying the callers name and number on a display, the reserved symbol indicating to the user that the name and number have been certified.

14. A process according to claim 1 implemented using a CLASS display telephone or CLASS display adjunct.

15. A process according to claim 5 wherein CCID is provided by a computer acting on the identity appearing in the MDMF sequence after verifying the signature.

16. A process of claim 6 wherein the process is implemented using a computer and further comprises a step of retrieving the digital certificate from a network server using R as the reference.

17. A process according to claim 1 wherein the process is implemented using TCP/IP protocol.

18. A process according to claim 1 wherein providing authentication comprises connecting to an intelligent peripheral (IP).

19. A process according to claim 18 wherein the IP Peripheral comprises an authentication server.

20. A process for caller identification comprising:
    providing certification of caller identification (CCID) to a called party by:
    receiving from an individual caller, called party information and a token associated uniquely with caller identification of the individual caller, the token being provided by an integrated circuit device capable of executing a cryptographic authentication protocol
    performing cryptographic authentication of caller identification using the token,
    and,
    during alerting of a called party line, sending to a terminating set certified caller identification comprising the authenticated caller identification and an indication to the called party that the caller identification has been uniquely authenticated by the individual caller.

21. A process according to claim 20 wherein the integrated circuit device comprises a smart card.

22. A process according to claim 21 wherein authentication of the caller identification is based on a challenge/response protocol using a secret key contained within the token that is used to uniquely encrypt a random challenge (number) issued by an authentication server temporarily linked to the originating caller's terminal, telephone or computing device.

23. A process according to claim 22 wherein cryptographic authentication is performed in conjunction with a personal identification number confirmation process.

24. A process according to claim 21 wherein cryptographic authentication is performed in conjunction with a biometric confirmation.

25. A system for caller identification comprising:
    providing certification of caller identification (CCID) sent to a called party by:
    means for receiving from an individual caller, called party information and a token associated uniquely with caller identification of the individual caller,
    means for performing authentication of caller identification using the token,
    and,
    means for sending to a terminating set, during alerting of a called party line, certified caller identification comprising the authenticated caller identification with an indication to the called party that the caller identification has been uniquely authenticated by the individual caller.

26. A system according to claim 25 wherein the integrated circuit device comprises a smart card.

27. A system according to claim 26 wherein the means for authentication of the token holder identification uses a challenge/response protocol using a secret key contained within the token that is used to uniquely encrypt a random challenge (number) issued by an authentication server temporarily linked to the originating caller's terminal, telephone or computing device.

28. A system according to claim 27 wherein the means for cryptographic authentication includes means for confirmation of a personal identification number.

29. A system according to claim 27 wherein means for cryptographic authentication includes means for biometric confirmation.

30. A system according to claim 25 comprises means for delivery of calling information using multiple data message format (MDMF).

31. A system according to claim 25 wherein SDMF/MDMF information comprises user name N, user number D and reference R to a standard X.509 digital certificate.

32. A system according to claim 31 comprising means for asserting that a specific token linked to a uniquely defined person has been used at a specific time and date T, to place a call to a line with a terminating directory number DT.

33. A system according to claim 31 wherein the reference R comprises a parameter in the MDMF format.

34. A system according to claim 30 wherein R comprises a digital signal on the D, N, T, and DT.

35. A system according to claim 31 wherein a character of the callers name field comprises a reserved symbol flagging the name as being certified.

36. A system according to claim 35 wherein the reserved character is the first character of the callers name field.

37. A system according to claim 33 comprising a one way authentication protocol which is digitally time stamped.

38. A system according to claim 36 comprising displaying the callers name and number on a display, the reserved symbol indicating to the user that the name and number have been certified.

39. A system according to claim 38 implemented using a CLASS display telephone or CLASS display adjunct.

40. A system according to claim 25 wherein the process is implemented using TCP/IP protocol.

41. A system according to claim 25 wherein providing authentication comprises connecting to an intelligent peripheral (IP).

42. A system according to claim 41 wherein the IP Peripheral comprises an authentication server.

43. A computer readable medium for implementing a method for caller identification with certification of caller identification (CCID), wherein certification comprises:

receiving from an individual caller, called party information and a token associated uniquely with caller identification of the individual caller, performing authentication of caller identification using the token, and, during alerting of a called party line, sending to a terminating set certified caller identification comprising the authenticated caller identification and an indication to the called party that the callers identification has been uniquely authenticated by the individual caller.

44. A computer readable medium according to claim 43 wherein the step of authentication comprises communicating with a token comprising an integrated device capable of executing a cryptographic authentication protocol.

* * * * *